United States Patent
Costell

(10) Patent No.: US 6,729,268 B1
(45) Date of Patent: May 4, 2004

(54) REAR SUPPORT PET LEASH

(76) Inventor: Arnold P. Costell, 6515 1/2 Vista Del Mar, Playa Del Rey, CA (US) 90293

(*) Notice: Subject to any disclaimer, the term of this patent is extended or adjusted under 35 U.S.C. 154(b) by 18 days.

(21) Appl. No.: 10/337,612

(22) Filed: Jan. 6, 2003

(51) Int. Cl.[7] ............ A61D 3/00; A01K 29/00
(52) U.S. Cl. ............ 119/726; 119/728; 119/856
(58) Field of Search ............ 119/726, 725, 119/727, 728, 850, 856

(56) References Cited

U.S. PATENT DOCUMENTS

| | | |
|---|---|---|
| 2,233,397 A | 3/1941 | Bloom |
| 2,464,867 A | 3/1949 | Johnson |
| 2,546,726 A | 3/1951 | Creamer, Jr. |
| 2,670,712 A | 3/1954 | Patience et al. |
| 2,976,840 A | 3/1961 | Hugus |
| 3,208,432 A | 9/1965 | Fisk |
| 3,215,117 A | 11/1965 | Short |
| 3,406,661 A | 10/1968 | Parkes |
| 4,375,203 A | 3/1983 | Parkes |
| 4,570,577 A | 2/1986 | Bellinger |
| 4,777,910 A | 10/1988 | Pecor |
| 4,821,676 A | 4/1989 | Hulterstrum |
| D310,435 S | 9/1990 | Cleveland |
| D330,273 S | 10/1992 | Cernek |
| 5,224,444 A | 7/1993 | Hill et al. |
| 5,427,061 A | 6/1995 | McCullough |
| D366,542 S | 1/1996 | Pierson |
| 5,485,810 A | 1/1996 | Sporn |
| 5,503,113 A | 4/1996 | Knight |
| 5,531,187 A | 7/1996 | Ward |
| 5,540,188 A | 7/1996 | Heinrichs |
| 5,613,467 A | 3/1997 | Arakawa |
| 5,682,840 A | 11/1997 | McFarland |
| 5,713,308 A | 2/1998 | Holt, Jr. |
| 5,845,606 A | 12/1998 | Hartman |
| 5,893,339 A | 4/1999 | Liu |
| 5,894,817 A | 4/1999 | Manuel |
| D437,623 S | 2/2001 | Ormsby |
| 6,216,636 B1 | 4/2001 | Butchko |
| 6,513,461 B2 * | 2/2003 | Sala Prat et al. ............ 119/725 |
| 6,595,162 B1 * | 7/2003 | Hibbert ............ 119/728 |

FOREIGN PATENT DOCUMENTS

DE 3837507 A1 1/1990

* cited by examiner

Primary Examiner—Charles T. Jordan
Assistant Examiner—Elizabeth Shaw
(74) Attorney, Agent, or Firm—David A. Belasco; Belasco Jacobs & Townsley, LLP

(57) ABSTRACT

A rear support pet leash includes a loop portion and a lifting portion, both portions being formed of flexible material. The loop portion has first and second ends and a medial section. Each of the first and second ends is attached adjacent the medial section to form first and second leg loops for fastening about the upper rear legs of a pet. The lifting portion is attached at an attaching end to the medial portion of the loop portion and has an adjustable handle at a lifting end. The lifting portion is adjustable to accommodate pets and pet owners of varying height. Leg loop pads are removably attachable to the first and second leg loops to provide additional comfort for the pet. Sliding adjustment means are provided for varying the size of the leg loops to accommodate different size pets. The adjusting means may be rings buckles or fabric loops.

13 Claims, 4 Drawing Sheets

REAR SUPPORT PET LEASH

FIELD OF INVENTION

The invention pertains to pet leashes. More particularly, the invention relates to a device for supporting the rear end of a pet having difficulty rising to a standing position due to injury or infirmity to the pet's hips, back or rear legs.

BACKGROUND OF THE INVENTION

As pets, particularly larger breeds of dogs, age they often develop problems with their hips, back or rear legs. These problems make it difficult for the pet to rise to a standing position. Various devices and techniques have been developed to allow pet owners to assist these animals and to alleviate the suffering associated with their conditions.

U.S. Pat. No. 6,216,636 issued to Butchko is directed to an apparatus for lifting and assisting convalescent pets with four legs to walk. The pet assist apparatus is positioned at the rear end of the animal in contact with the animal's lower abdomen to provide support to the rear end of the animal. The device has a sling portion having a padded central section, two distal sections and two handle grips.

U.S. Pat. No. Des. 437,623 issued to Ormsby, discloses an ornamental design for a weight-lifting strap. The strap has first and second ends that are terminated in loops and a cable hook device may be added to the center of the strap for lifting purposes.

U.S. Pat. No. 5,845,606, issued to Hartman is directed to a pet animal mobility aid. The two rearward loops and extend around hind legs of a four-legged animal. The handle member is coupled with the rearward portion of the central strap to apply an appropriate lifting force to the dog along the hind portion to assist in standing and walking. An auxiliary lead may be attached to a ring on the central strap to provide further assistance during walking. Also, cushioning pads are disposed on the straps that form the loops.

U.S. Pat. No. 4,375,203 issued to Parkes discloses a prosthetic cart for animals with four legs. This wheeled cart to which the animal is to be harnessed comprises a vertical standard in the shape of an upward loop extending from adjustment blocks serving as a cross member. Hip support member comprises a pair of padded loops.

U.S. Pat. No. Des. 330,273 issued to Cernek is directed to an ornamental design for a recuperative animal support harness. The harness includes straps that are criss-crossed under the rear leg portions of a dog to provide lifting support.

While other variations exist, the above-described designs for pet support devices are typical of those encountered in the prior art. It is an objective of the present invention to provide means for assisting an injured or infirm pet to rise to a standing position. It is a further objective to provide a means to assist such a pet to walk and return to a sitting position comfortably. It is a still further objective of the invention to provide a device that can be easily used for pets of various sizes. It is yet a further objective to provide a pet support device that can be comfortably used by pet owners of various heights. Finally, it is an objective of the invention to provide a pet support device that is durable and that may be manufactured inexpensively.

While some of the objectives of the present invention are disclosed in the prior art, none of the inventions found include all of the requirements identified.

SUMMARY OF THE INVENTION

The present invention addresses all of the deficiencies of prior art pet support devices and satisfies all of the objectives described above.

(1) A rear support pet leash providing all of the desired features may be constructed from the following components. A loop portion is provided. The loop portion is formed of flexible material and has a first end, a second end and a medial section. The first end is fixedly attached to the medial section at a first point and thereby forms a first leg loop. The second end is fixedly attached to the medial section at a second point and thereby forms a second leg loop. The first and second leg loops are sized and shaped to fit about left and right rear upper legs of a pet. A lifting portion is provided. The lifting portion is formed of flexible material and has an attaching end and a lifting end. The attaching end is fixedly attached to the medial section at a third point between the first point and the second point.

The lifting end has a handle portion. The lifting portion has means for adjusting a length of the lifting portion. When the first and second leg loops are located about the rear legs of the pet an upward force is exerted through the lifting portion to assist the pet to rise to a standing position.

(2) In a variant of the invention, a first leg loop pad is provided. The first leg loop pad is sized and shaped to cover at least a lower part of an inner portion of the first leg loop. A second leg loop pad is provided. The second leg loop pad is sized and shaped to cover at least a lower part of an inner portion of the second leg loop. The first and second leg loop pads are attached to the inner portions of the first and second leg loops. When the first and second leg loop pads are attached to inner portions of the first and second leg loops, the comfort of the pet located in the rear support pet leash will be increased.

(3) In a further variant, the first and second leg loop pads are tubular in nature and removably attachable about the first and second leg loops.

(4) In still a further variant, the first and second leg loop pads are removably attachable about the first and second leg loops using fasteners the have a hooking portion and a looping portion.

(5) In another variant, means are provided for adjusting a size of the first and second leg loops.

(6) In still another variant of the invention, the means for adjusting the size of the first and second leg loops further includes first and second rings. The first and second rings are sized, shaped and located to fit frictionally about the first and second leg loops, respectively. When the first and second rings are located about the first and second leg loops, the leg loops may be adjusted to fit comfortably about the rear legs of pets of varying sizes.

(7) In still a further variant, the means for adjusting the size of the first and second leg loops further includes first and second fabric strips. Each of the fabric strips has a hooking portion on a first surface and a looping portion on an opposite second surface. The first and second fabric strips are located about the first and second leg loops so as to slide frictionally over the leg loops. When the fabric strips are located about the leg loops, a user may adjust the size of the first and second leg loops so as to fit comfortably about the rear legs of pets of various sizes.

(8) In yet a further variant, the means for adjusting the size of the first and second leg loops further includes first and second buckles. Each of the first and second buckles have first and second side portions, a center web section joined to the side portions, upper and lower end portions joined to the side portions and first and second slots. The slots are formed between the end portions and the center web section. The first and second slots are sized and shaped to fit frictionally about the first and second leg loops. When each of the first and second leg loops is fed through the first slot, over the center web section and through the second slot of one of the first and second buckles, the first and second buckles will serve as means for adjusting the size of the first and second leg loops.

(9) In yet a further variant of the invention, the means for adjusting the length of the lifting portion further includes a tab portion. The tab portion has a slotted section and a fastening section fixedly attached to an anterior end of the slotted section. The slotted section is sized and shaped to slide frictionally about the lifting portion and is capable of gripping the lifting portion when pulled away from the lifting end. The fastening section has first and second resilient members, the resilient members extending outwardly from it. The slotted section is located on the lifting portion. A socket portion is provided. The socket portion is fixedly attached to the lifting end of the lifting portion and is sized and shaped to fit removably over the fastening section of the tab portion. When the fastening section of the tab portion is inserted into the socket portion the handle portion will be formed and the length of the lifting portion will be adjustable by movement of the slotted section of the tab portion along the lifting portion.

Figure 1:
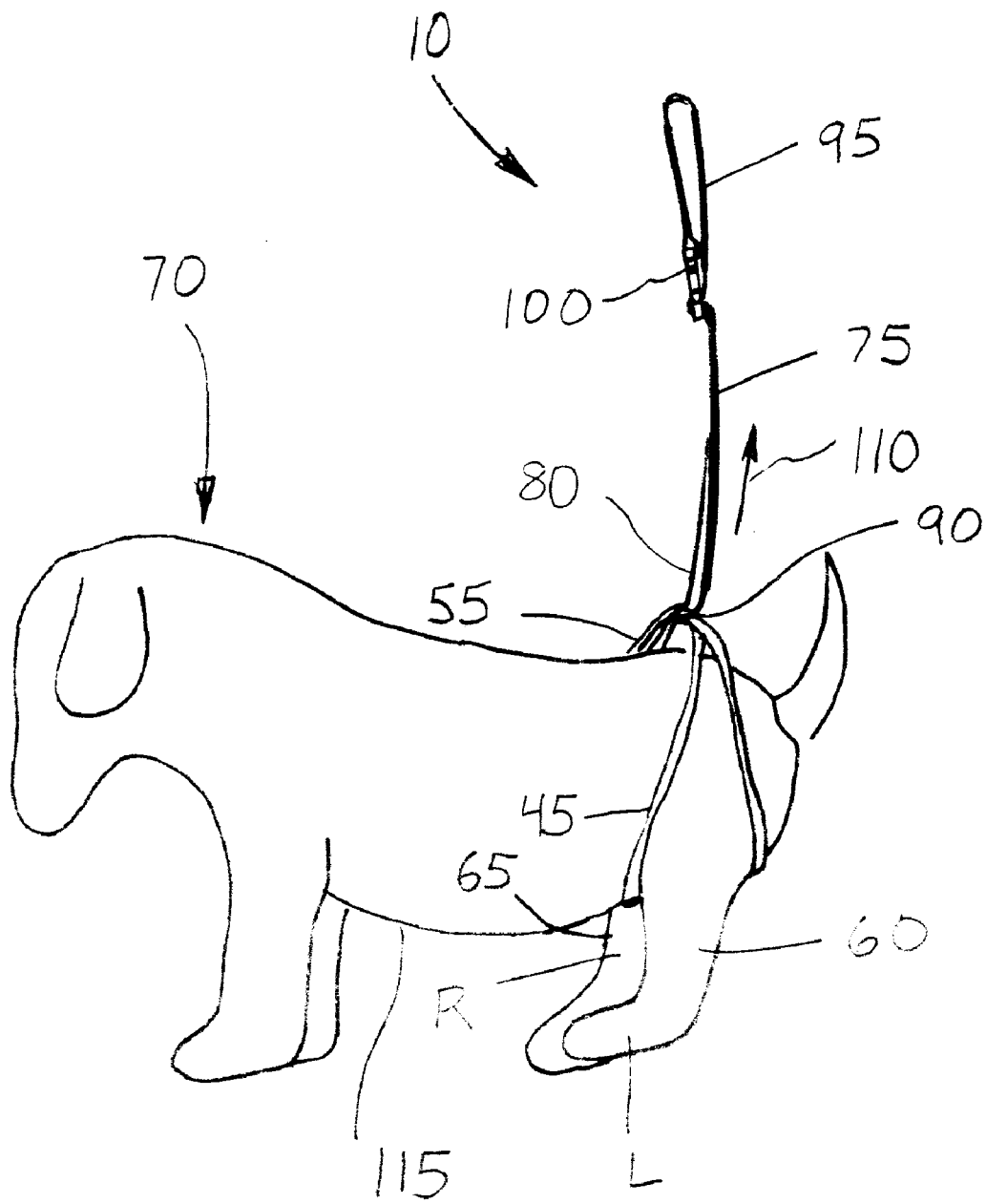
FIG. 1 is a perspective view of the preferred embodiment of the invention fastened about the rear legs of a pet.
Figure 2:
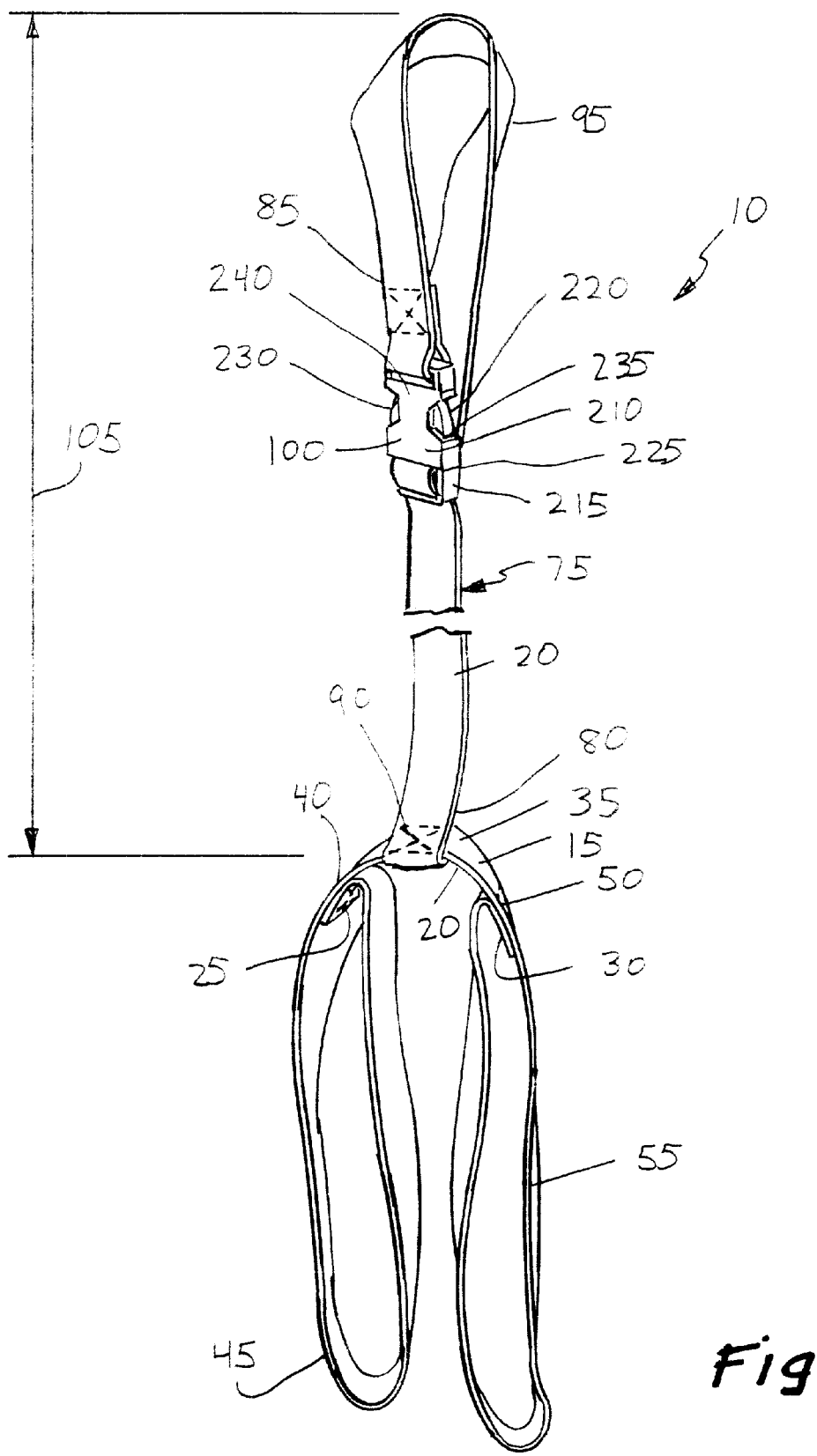
FIG. 2 is a close-up perspective view of the FIG. 1 embodiment illustrating the means for adjusting the length of the lifting portion.

DETAILED DESCRIPTION OF THE PREFERRED EMBODIMENT (1) As illustrated in FIGS. 1 and 2, a rear support pet leash 10 providing all of the desired features may be constructed from the following components. A loop portion 15 is provided. The loop portion 15 is formed of flexible material 20 and has a first end 25, a second end 30 and a medial section 35. The first end 25 is fixedly attached to the medial section 35 at a first point 40 and thereby forms a first leg loop 45. The second end 30 is fixedly attached to the medial section 35 at a second point 50 and thereby forms a second leg loop 55. The first 45 and second 55 leg loops are sized and shaped to fit about left 60 and right 65 rear upper legs of a pet 70. A lifting portion 75 is provided. The lifting portion 75 is formed of flexible material 20 and has an attaching end 80 and a lifting end 85. The attaching end 80 is fixedly attached to the medial section 35 at a third point 90 between the first point 40 and the second point 50.

The lifting end 85 has a handle portion 95. The lifting portion 75 has means 100 for adjusting a length 105 of the lifting portion 75. When the first 45 and second 55 leg loops are located about the rear legs 60, 65 of the pet 70 an upward force 110 is exerted through the lifting portion 75 to assist the pet 70 to rise to a standing position 115.

Figure 3:
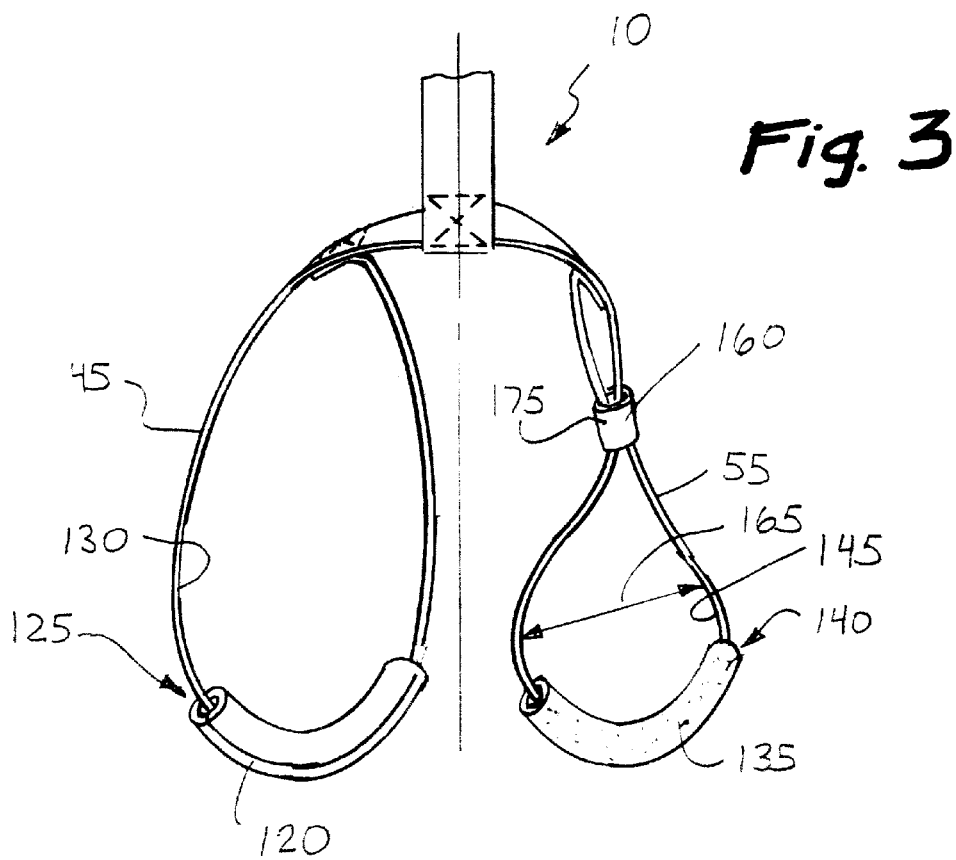
FIG. 3 is a perspective view of a lower portion of the leash illustrating two embodiment of leg loop pads an a means for adjusting the leg loops.

(2) In a variant of the invention, as illustrated in FIG. 3, a first leg loop pad 120 is provided. The first leg loop pad 120 is sized and shaped to cover at least a lower part 125 of an inner portion 130 of the first leg loop 45. A second leg loop pad 135 is provided. The second leg loop pad 135 is sized and shaped to cover at least a lower part 140 of an inner portion 145 of the second leg loop 55. The first 120 and second 135 leg loop pads are attached to the inner portions 130, 145 of the first 45 and second 55 leg loops. When the first 120 and second 135 leg loop pads are attached to inner portions 130, 145 of the first 45 and second 55 leg loops, the comfort of the pet 70 located in the rear support pet leash 10 will be increased.

(3) In a further variant, as illustrated in FIG. 3, the first 120 and second 135 leg loop pads are tubular in nature and removably attachable about the first 45 and second 55 leg loops.

Figure 4:
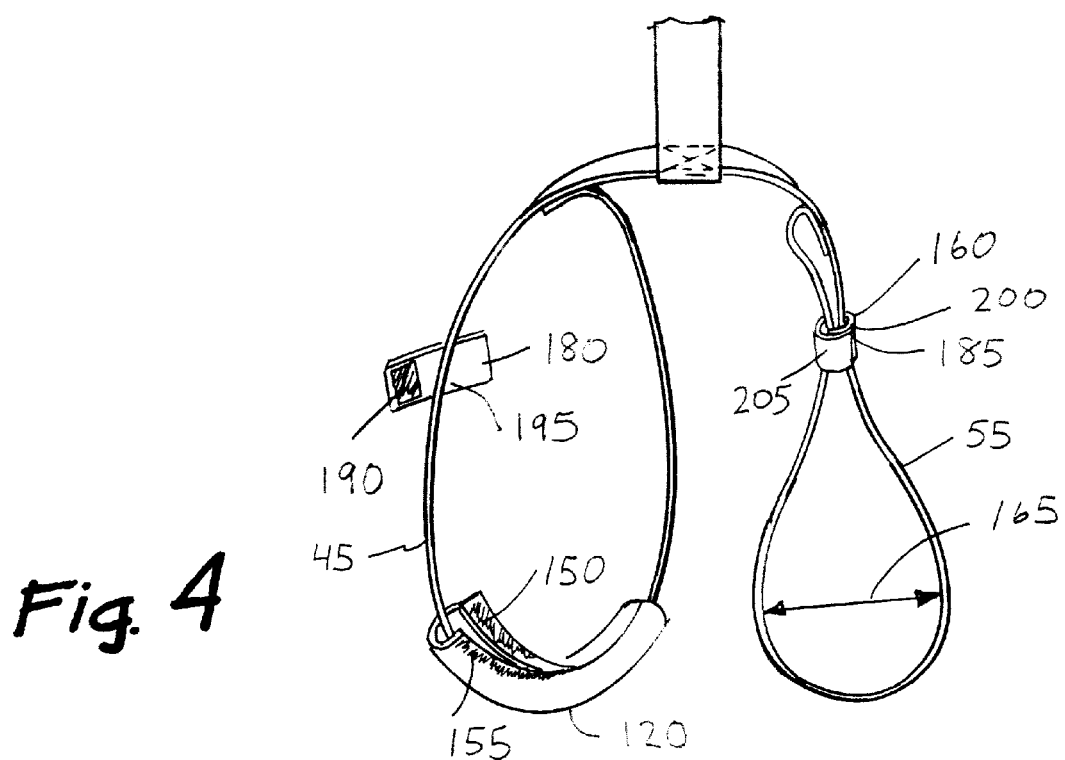
FIG. 4 is a perspective view of a lower portion of the leash illustrating a third embodiment of leg loop pads and an alternative means for adjusting the leg loops.

(4) In still a further variant, as illustrated in FIG. 4, the first 120 and second 135 leg loop pads are removably attachable about the first 45 and second 55 leg loops using fasteners that have a hooking portion 150 and a looping portion 155.

(5) In another variant, as illustrated in FIGS. 3 and 4, means 160 are provided for adjusting a size 165 of the first 45 and second 55 leg loops.

(6) In still another variant of the invention, as illustrated in FIG. 3, the means 160 for adjusting the size 165 of the first 45 and second 55 leg loops further includes first (not shown) and second 175 rings. The first and second 175 rings are sized, shaped and located to fit frictionally about the first 45 and second 55 leg loops, respectively. When the first and second 175 rings are located about the first 45 and second 55 leg loops, the leg loops 45, 55 may be adjusted to fit comfortably about the rear legs 60, 65 of pets 70 of varying sizes.

(7) In still a further variant, as illustrated in FIG. 4, the means 160 for adjusting the size 165 of the first 45 and second 55 leg loops further includes first 180 and second 185 fabric strips. Each of the fabric strips 180, 185 has a hooking portion 190 on a first surface 195 and a looping portion 200 on an opposite second surface 205. The first 180 and second 185 fabric strips are located about the first 45 and second 55 leg loops so as to slide frictionally over the leg loops 45, 55. When the fabric strips 180, 185 are located about the leg loops 45, 55, a user may adjust the size of the first 45 and second 55 leg loops so as to fit comfortably about the rear legs 60, 65 of pets 70 of various sizes.

Figure 5:
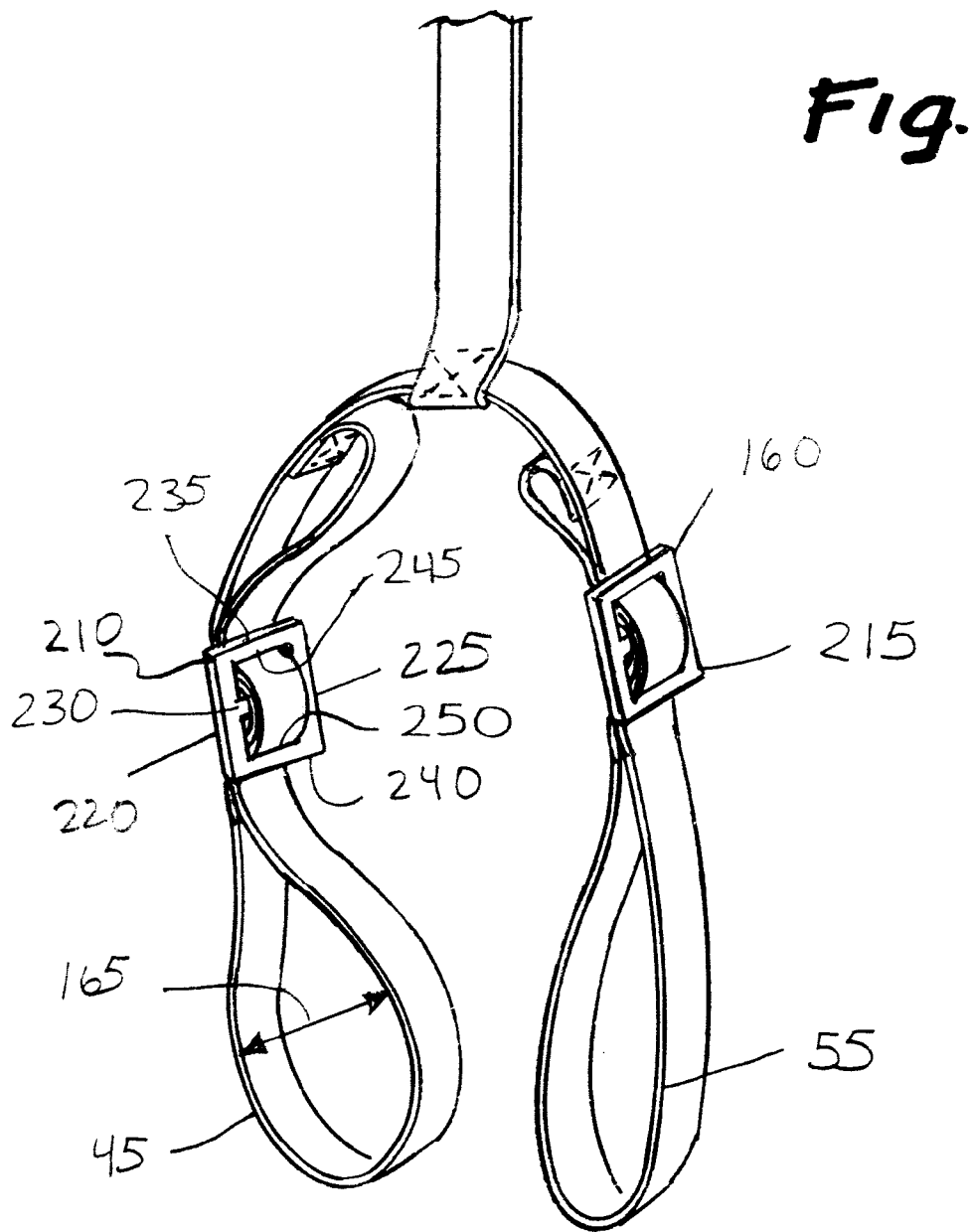
FIG. 5 is a perspective view of a lower portion of the leash illustrating a buckle means for adjusting the size of the leg loops.

(8) In yet a further variant, as illustrated in FIG. 5, the means 160 for adjusting the size 165 of the first 45 and second 55 leg loops further includes first 210 and second 215 buckles. Each of the first 210 and second 215 buckles have first 220 and second 225 side portions, a center web section 230 joined to the side portions 220, 225, upper 235 and lower 240 end portions joined to the side portions 220, 225 and first 245 and second 250 slots. The slots 245, 250 are formed between the end portions 235, 240 and the center web section 230. The first 245 and second 250 slots are sized and shaped to fit frictionally about the first 45 and second 55 leg loops. When each of the first 45 and second 55 leg loops is fed through the first slot 245, over the center web section 230 and through the second slot 250 of one of the first 210 and second 215 buckles, the first 210 and second 215 buckles will serve as means 160 for adjusting the size 165 of the first 45 and second 55 leg loops.

(9) In a final variant of the invention, as illustrated in FIG. 2, the means 100 for adjusting the length 105 of the lifting portion 75 further includes a tab portion 210. The tab portion 210 has a slotted section 215 and a fastening section 220 fixedly attached to an anterior end 225 of the slotted section 215. The slotted section 215 is sized and shaped to slide frictionally about the lifting portion 75 and is capable of gripping the lifting portion 75 when pulled away from the lifting end 85. The fastening section 220 has first 230 and second 235 resilient members, the resilient members 230, 235 extending outwardly from it. The slotted section 215 is located on the lifting portion 75. A socket portion 240 is provided. The socket portion 240 is fixedly attached to the lifting end 85 of the lifting portion 75 and is sized and shaped to fit removably over the fastening section 220 of the tab portion 210. When the fastening section 220 of the tab portion 210 is inserted into the socket portion 240 the handle portion 95 will be formed and the length 105 of the lifting portion 75 will be adjustable by movement of the slotted section 215 of the tab portion 210 along the lifting portion.

The rear support pet leash 10 has been described with reference to particular embodiments. Other modifications and enhancements can be made without departing from the spirit and scope of the claims that follow.

What is claimed is:

1. A rear support pet leash, comprising:
   a loop portion, said loop portion being formed of flexible material and having a first end, a second end and a medial section;
   said first end being fixedly attached to said medial section at a first point and thereby forming a first leg loop;
   said second end being fixedly attached to said medial section at a second point and thereby forming a second leg loop;
   said first and second leg loops being sized and shaped to fit about left and right rear upper legs of a pet;
   a lifting portion, said lifting portion being formed of flexible material and having an attaching end and a lifting end;
   said attaching end being fixedly attached to said medial section at a third point between said first point and said second point;
   said lifting end having a handle portion;
   said lifting portion having means for adjusting a length of said lifting portion; and
   whereby, when said first and second leg loops are disposed about the rear legs of the pet an upward force is exerted through said lifting portion to assist the pet to rise to a standing position.

2. A rear support pet leash, as described in claim 1, further comprising:
   a first leg loop pad, said first leg loop pad being sized and shaped to cover at least a lower part of an inner portion of said first leg loop;
   a second leg loop pad, said second leg loop pad being sized and shaped to cover at least a lower part of an inner portion of said second leg loop;
   said first and second leg loop pads being attached to said inner portions of said first and second leg loops; and
   whereby, when said first and second leg loop pads are attached to inner portions of said first and second leg loops, the comfort of the pet disposed in said rear support pet leash will be increased.

3. A rear support pet leash, as described in claim 2, wherein said first and second leg loop pads are tubular in nature and removably attachable about said first and second leg loops.

4. A rear support pet leash, as described in claim 2, wherein said first and second leg loop pads are removably attachable about said first and second leg loops using fasteners having a hooking portion and a looping portion.

5. A rear support pet leash, as described in claim 1, further comprising means for adjusting a size of said first and second leg loops.

6. A rear support pet leash, as described in claim 5, wherein said means for adjusting the size of said first and second leg loops further comprises:
   first and second rings, said first and second rings being sized, shaped and disposed to fit frictionally about said first and second leg loops, respectively; and
   whereby, when said first and second rings are disposed about said first and second leg loops, said leg loops may be adjusted to fit comfortably about the rear legs of pets of varying sizes.

7. A rear support pet leash, as described in claim 6, wherein said means for adjusting the size of said first and second leg loops further comprises:
   first and second fabric strips, each of said fabric strips having a hooking portion on a first surface and a looping portion on an opposite second surface;
   said first and second fabric strips being disposed about said first and second leg loops so as to slide frictionally over said leg loops; and
   whereby, when said fabric strips are disposed about said leg loops, a user may adjust the size of said first and second leg loops so as to fit comfortably about the rear legs of pets of various sizes.

8. A rear support pet leash, as described in claim 6, wherein said means for adjusting the size of said first and second leg loops further comprises:
   first and second buckles, each of said first and second buckles having first and second side portions, a center web section joined to said side portions, upper and lower end portions joined to said side portions and first and second slots, said slots being formed between said end portions and said center web section;
   said first and second slots being sized and shaped to fit frictionally about said first and second leg loops; and
   whereby, when each of said first and second leg loops is fed through said first slot, over said center web section and through said second slot of one of said first and second buckles, said first and second buckles will serve as means for adjusting the size of said first and second leg loops.

9. A rear support pet leash, as described in claim 1, wherein the means for adjusting the length of said lifting portion further comprises:
   a tab portion, said tab portion having a slotted section and a fastening section fixedly attached to an anterior end of said slotted section;
   said slotted section being sized and shaped to slide frictionally about said lifting portion and being capable of gripping said lifting portion when pulled away from said lifting end;
   said fastening section having first and second resilient members, said resilient members extending outwardly therefrom;
   said slotted section being disposed upon said lifting portion;
   a socket portion, said socket portion being fixedly attached to said lifting end of said lifting portion and being sized and shaped to fit removably over said fastening section of said tab portion; and
   whereby, when said fastening section of said tab portion is inserted into said socket portion said handle portion will be formed and said length of said lifting portion will be adjustable by movement of said slotted section of said tab portion along said lifting portion.

10. A rear support pet leash, comprising:

a loop portion, said loop portion being formed of flexible material and having a first end, a second end and a medial section;

said first end being fixedly attached to said medial section at a first point and thereby forming a first leg loop;

said second end being fixedly attached to said medial section at a second point and thereby forming a second leg loop;

said first and second leg loops being sized and shaped to fit about left and right rear upper legs of a pet;

a lifting portion, said lifting portion being formed of flexible material and having an attaching end and a lifting end;

said attaching end being fixedly attached to said medial section at a third point between said first point and said second point;

said lifting end having a handle portion;

said lifting portion having means for adjusting a length of said lifting portion;

means for adjusting a size of said first and second leg loops; and whereby, when said first and second leg loops are disposed about the rear legs of the pet an upward force is exerted through said lifting portion to assist the pet to rise to a standing position.

11. A rear support pet leash, as described in claim 10 wherein said means for adjusting the size of said first and second leg loops further comprises:

first and second rings, said first and second rings being sized, shaped and disposed to fit frictionally about said first and second leg loops, respectively; and whereby, when said first and second rings are disposed about said first and second leg loops, said leg loops may be adjusted to fit comfortably about the rear legs of pets of varying sizes.

12. A rear support pet leash, as described in claim 10, wherein said means for adjusting the size of said first and second leg loops further comprises:

first and second fabric strips, each of said fabric strips having a hooking portion on a first surface and a looping portion on an opposite second surface;

said first and second fabric strips being disposed about said first and second leg loops so as to slide frictionally over said leg loops; and whereby, when said fabric strips are disposed about said leg loops, a user may adjust the size of said first and second leg loops so as to fit comfortably about the rear legs of pets of various sizes.

13. A rear support pet leash, as described in claim 10, wherein said means for adjusting the size of said first and second leg loops further comprises:

first and second buckles, each of said first and second buckles having first and second side portions, a center web section joined to said side portions, upper and lower end portions joined to said side portions and first and second slots, said slots being formed between said end portions and said center web section;

said first and second slots being sized and shaped to fit frictionally about said first and second leg loops; and whereby, when each of said first and second leg loops is fed through said first slot, over said center web section and through said second slot of one of said first and second buckles, said first and second buckles will serve as means for adjusting the size of said first and second leg loops.

* * * * *